US006094920A

United States Patent [19]

Kawase

[11] Patent Number: 6,094,920

[45] Date of Patent: Aug. 1, 2000

[54] CIRCUIT AND METHOD FOR CONTROLLING TEMPERATURE WITHOUT USING CPU AND SOFTWARE

[75] Inventor: Tadafumi Kawase, Niigata, Japan

[73] Assignee: NEC Corporation, Tokyo, Japan

[21] Appl. No.: 09/227,187

[22] Filed: Jan. 8, 1999

[30] Foreign Application Priority Data

Jan. 9, 1998 [JP] Japan .................................. 10-003477

[51] Int. Cl.[7] ............................ F25B 21/02; G05D 23/00

[52] U.S. Cl. ............................................. 62/3.7; 236/78 R

[58] Field of Search ................................ 62/3.2, 3.3, 3.1, 62/3.7, 229, 130; 236/74 R, 75, 78 R, 74 A

[56] References Cited

U.S. PATENT DOCUMENTS

| | | | |
|---|---|---|---|
| 4,187,093 | 2/1980 | Boratgis et al. | 62/229 X |
| 4,283,921 | 8/1981 | Prosky | 62/130 X |
| 4,325,225 | 4/1982 | Price, II | 62/229 |
| 4,364,234 | 12/1982 | Reed | 62/3.7 X |
| 4,638,850 | 1/1987 | Newell, III et al. | 236/78 R X |
| 5,603,220 | 2/1997 | Seaman | 62/3.7 |

FOREIGN PATENT DOCUMENTS

| | | |
|---|---|---|
| 59-191622 | 10/1984 | Japan . |
| 60-164807 | 8/1985 | Japan . |
| 2-170388 | 7/1990 | Japan . |
| 9-34306 | 2/1997 | Japan . |

*Primary Examiner*—Harry B. Tanner
*Attorney, Agent, or Firm*—Foley & Lardner

[57] ABSTRACT

A temperature control circuit comprises a temperature detection circuit for detecting the temperature of an object and outputting a temperature detection voltage, a first reference voltage generation circuit for generating a first reference voltage that corresponds to the upper limit of a predetermined suitable temperature range, a second reference voltage generation circuit for generating a second reference voltage that corresponds to the lower limit of the suitable temperature range, a first temperature comparison circuit for comparing the temperature detection voltage with the first reference voltage, a second temperature comparison circuit for comparing the temperature detection voltage with the second reference voltage, a temperature control signal generation circuit for generating a temperature control signal for controlling ON/OFF of a power supply of a cooler based on outputs signals of the first and second temperature comparison circuit, and a temperature control circuit for setting ON/OFF the power supply of the cooler according to the temperature control signal. The temperature control signal generation circuit including two monostable multivibrators generates a pulse oscillation signal when the temperature of the object is between the upper limit and the lower limit, thereby temperature control can be executed precisely only by hardware.

20 Claims, 8 Drawing Sheets

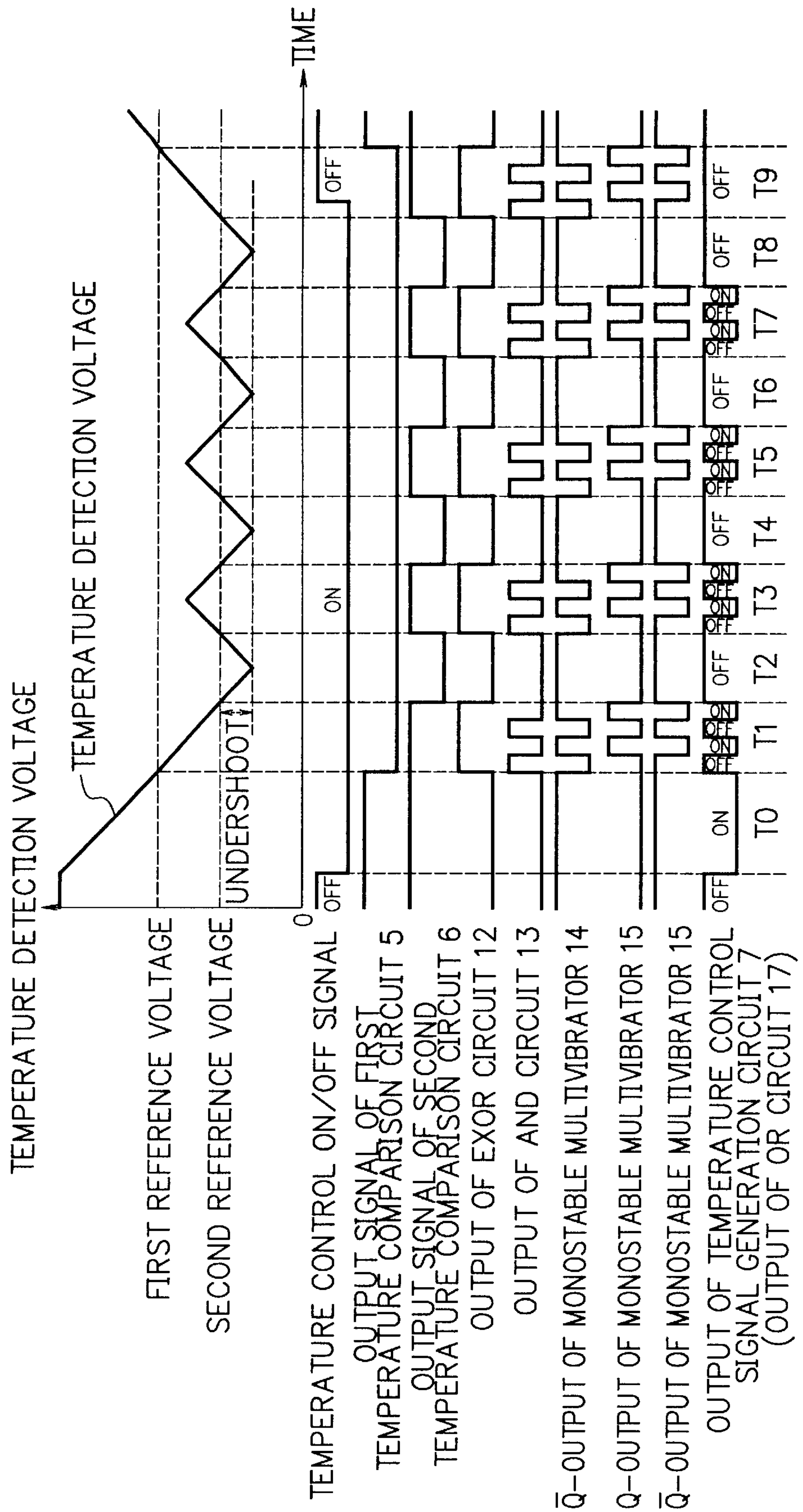
F I G. 4
TEMPERATURE DETECTION VOLTAGE
TEMPERATURE DETECTION VOLTAGE
FIRST REFERENCE VOLTAGE
SECOND REFERENCE VOLTAGE
UNDERSHOOT
TIME
0
TEMPERATURE CONTROL ON/OFF SIGNAL
OUTPUT SIGNAL OF FIRST TEMPERATURE COMPARISON CIRCUIT 5
OUTPUT SIGNAL OF SECOND TEMPERATURE COMPARISON CIRCUIT 6
OUTPUT OF EXOR CIRCUIT 12
OUTPUT OF AND CIRCUIT 13
Q̄-OUTPUT OF MONOSTABLE MULTIVIBRATOR 14
Q-OUTPUT OF MONOSTABLE MULTIVIBRATOR 15
Q̄-OUTPUT OF MONOSTABLE MULTIVIBRATOR 15
OUTPUT OF TEMPERATURE CONTROL SIGNAL GENERATION CIRCUIT 7 (OUTPUT OF OR CIRCUIT 17)
ON
OFF
T0
T1
T2
T3
T4
T5
T6
T7
T8
T9

OBJECT
1
COOLER
20
TEMPERATURE CONTROL CIRCUIT
8
TEMPERATURE CONTROL SIGNAL GENERATION CIRCUIT
7B
TEMPERATURE DETECTION CIRCUIT
2
FIRST TEMPERATURE COMPARISON CIRCUIT
5B
SECOND TEMPERATURE COMPARISON CIRCUIT
6B
TEMPERATURE CONTROL ON/OFF SIGNAL GENERATION CIRCUIT
9
FIRST REFERENCE VOLTAGE GENERATION CIRCUIT
3
SECOND REFERENCE VOLTAGE GENERATION CIRCUIT
4

TEMPERATURE CONTROL SIGNAL
17B
16B
15
Monostable Multivibrator
A
B
CLR
Cext
Rext/Cext
Q
Q̄
VCC
14
Monostable Multivibrator
A
B
CLR
Cext
Rext/Cext
Q
Q̄
VCC
7B
PULL UP
13
12
10
11
5B
6B
TEMPERATURE CONTROL ON/OFF SIGNAL
TEMPERATURE DETECTION VOLTAGE
FIRST REFERENCE VOLTAGE
SECOND REFERENCE VOLTAGE

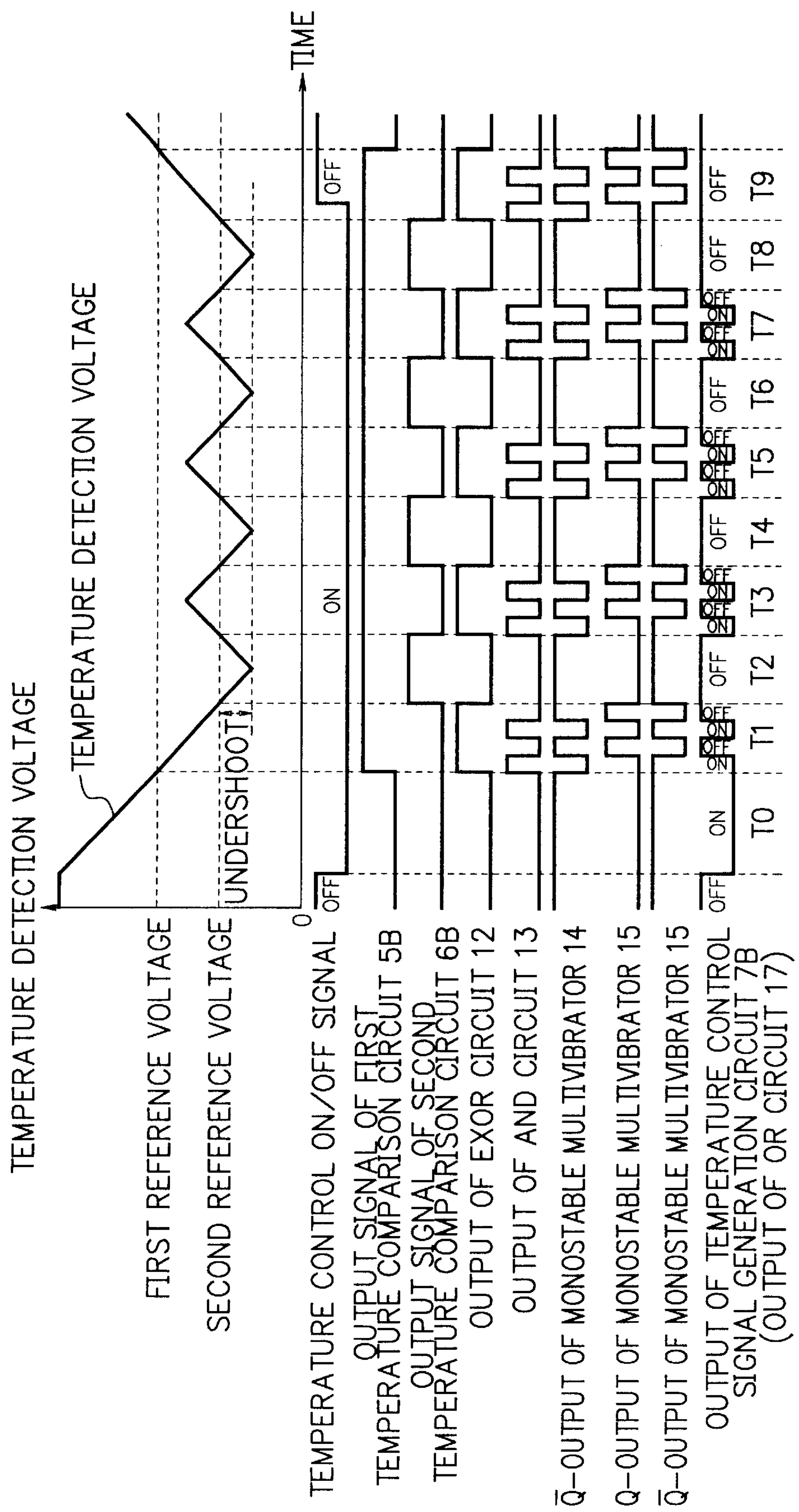
F I G. 8
TEMPERATURE DETECTION VOLTAGE
TEMPERATURE DETECTION VOLTAGE
TIME
FIRST REFERENCE VOLTAGE
SECOND REFERENCE VOLTAGE
UNDERSHOOT
0
TEMPERATURE CONTROL ON/OFF SIGNAL
OUTPUT SIGNAL OF FIRST TEMPERATURE COMPARISON CIRCUIT 5B
OUTPUT SIGNAL OF SECOND TEMPERATURE COMPARISON CIRCUIT 6B
OUTPUT OF EXOR CIRCUIT 12
OUTPUT OF AND CIRCUIT 13
Q̄-OUTPUT OF MONOSTABLE MULTIVIBRATOR 14
Q-OUTPUT OF MONOSTABLE MULTIVIBRATOR 15
Q̄-OUTPUT OF MONOSTABLE MULTIVIBRATOR 15
OUTPUT OF TEMPERATURE CONTROL SIGNAL GENERATION CIRCUIT 7B (OUTPUT OF OR CIRCUIT 17)
OFF
ON
OFF
ON
OFF
OFF
ON
T0
T1
T2
T3
T4
T5
T6
T7
T8
T9

CIRCUIT AND METHOD FOR CONTROLLING TEMPERATURE WITHOUT USING CPU AND SOFTWARE

BACKGROUND OF THE INVENTION

The present invention relates to a temperature control circuit and a temperature control method, and in particular, to a temperature control circuit and a temperature control method by which temperature control of an object can be executed without using a CPU and software.

Description of the Prior Art

Conventional circuits for controlling the temperature of a cooled object etc. are generally designed to perform the temperature control according to instructions of a CPU and software. FIG. 1 is a block diagram showing functional blocks of a conventional temperature control circuit. Referring to FIG. 1, the conventional temperature control circuit is composed of a temperature detection circuit 102 for detecting the temperature of a cooled object 101, a cooler section 104 for cooling the object 101 and controlling the temperature of the object 101, and a CPU (Central Processing Unit) 103 for monitoring the temperature detected by the temperature detection circuit 102 and controlling the cooler section 104 based on the result of the monitoring so that the temperature of the object 101 will be maintained adequately. The CPU 103 compares the temperature detected by the temperature detection circuit 102 with a predetermined reference temperature, and controls the cooler section 104 according to the result of the comparison.

However, such a temperature control circuit which employs software burdens the CPU 103 much, therefore, a high-cost high-performance CPU becomes necessary, or an extra CPU has to be added to a system (for example, a car which is provided with a cooler box) which includes the temperature control circuit, only for the execution of temperature control.

On the other hand, there have been proposed temperature control circuits which execute temperature control of objects without using a CPU and software. In Japanese Patent Application Laid-Open No.SHO59-191622, a temperature control circuit for controlling the temperature of a constant temperature bath has been proposed. The constant temperature bath is provided with a binary-controlled cooler and a continuously controlled heater. The heater is supplied with a first power when the cooler is ON, and the heater is supplied with a second power which is lower than the first power when the cooler is OFF. The first power is set higher than the second power in order to reduce overshoot (temperature too high) and undershoot (temperature too low) which occur in the temperature control.

In Japanese Patent Application Laid-Open No.SHO60-164807, a temperature control circuit for reducing either the overshoot or the undershoot has been proposed. In the temperature control circuit, a proportional control circuit outputs a power which is proportional to the difference between a detected temperature Td and a predetermined temperature Tp to a heater which is provided in a constant temperature bath. The proportionality constant of the proportional control circuit is negative since the proportional control is executed to the heater. The proportional temperature control (100%~0%) is executed by the proportional control circuit in a predetermined proportional control zone in temperature. The proportional control circuit outputs constant powers (100% and 0%) outside the proportional control zone. The width of the proportional control zone on the right-hand side of the origin (a point on the (Td−Tp) axis where Td−Tp=0) is set different from the width of the proportional control zone on the left-hand side of the origin. In the case where the right-hand side proportional control zone width is set narrower than the left-hand side proportional control zone width (4:6, for example), the power supplied to th eater when Td−Tp=0 becomes relatively low (40%). Therefore, relatively low (40%) power is supplied to the heater when the temperature is raised to the predetermined temperature Tp, and thus the overshoot can be reduced. On the other hand, in the case where the right-hand side proportional control zone width is set wider than the left-hand side proportional control zone width (6:4, for example), the power supplied to the heater when Td−Tp=0 becomes relatively high (60%). Therefore, relatively high (60%) power is supplied to the heater when the temperature is lowered to the predetermined temperature Tp, and thus the undershoot can be reduced.

In the above two conventional temperature control circuits, temperature control of the constant temperature bath can be executed only by circuits without using a CPU and software, however, precision of the temperature control by such conventional temperature control circuits is not high enough.

SUMMARY OF THE INVENTION

It is therefore the primary object of the present invention to provide a temperature control circuit, by which temperature control of an object can be executed with high precision only by hardware, without employing a CPU and software.

Another object of the present invention is to provide a temperature control method, by which temperature control of an object can be executed with high precision only by hardware, without employing a CPU and software.

In accordance with a first aspect of the present invention, there is provided a temperature control circuit comprising a temperature detection circuit, a first reference voltage generation circuit, a second reference voltage generation circuit, a first temperature comparison circuit, a second temperature comparison circuit, a temperature control signal generation circuit, and a temperature control circuit. The temperature detection circuit detects the temperature of an object and outputs a temperature detection voltage that corresponds to the detected temperature of the object. The first reference voltage generation circuit generates a first reference voltage that corresponds to the upper limit of a predetermined suitable temperature range for the object. The second reference voltage generation circuit generates a second reference voltage that corresponds to the lower limit of the suitable temperature range for the object. The first temperature comparison circuit is supplied with the temperature detection voltage from the temperature detection circuit and the first reference voltage from the first reference voltage generation circuit, and executes comparison between the two voltages. The second temperature comparison circuit is supplied with the temperature detection voltage from the temperature detection circuit and the second reference voltage from the second reference voltage generation circuit, and executes comparison between the two voltages. The temperature control signal generation circuit is supplied with output signals of the first and second temperature comparison circuits which represent the results of the comparison, and generates a temperature control signal for controlling ON/OFF of a power supply of a cooler, based on the results of the comparison. And the temperature control circuit sets ON/OFF the power supply of the cooler according to the temperature control signal.

In accordance with a second aspect of the present invention, in the first aspect, the temperature control signal generation circuit includes a pulse oscillation signal generation circuit which outputs a pulse oscillation signal as the temperature control signal in order to alternately change ON/OFF of the power supply of the cooler, when the output signal of the first temperature comparison circuit indicates that the temperature of the object is lower than the upper limit of the suitable temperature range and the output signal of the second temperature comparison circuit indicates that the temperature of the object is higher than the lower limit of the suitable temperature range. The temperature control signal generation circuit outputs the temperature control signal for setting the power supply of the cooler ON when the output signal of the first temperature comparison circuit indicates that the temperature of the object is higher than the upper limit of the suitable temperature range, and outputs the temperature control signal for setting the power supply of the cooler OFF when the output signal of the second temperature comparison circuit indicates that the temperature of the object is lower than the lower limit of the suitable temperature range.

In accordance with a third aspect of the present invention, in the second aspect, the duty factor of the pulse oscillation signal outputted by the pulse oscillation signal generation circuit can be varied.

In accordance with a fourth aspect of the present invention, in the second aspect, the temperature control signal is used for setting ON/OFF of power supply to a Peltier chip which is included in the cooler.

In accordance with a fifth aspect of the present invention, in the first aspect, the temperature control circuit further comprises a temperature control ON/OFF signal generation circuit. The temperature control ON/OFF signal generation circuit outputs a temperature control ON/OFF signal for starting and ending the temperature control of the object to the temperature control signal generation circuit.

In accordance with a sixth aspect of the present invention, in the first aspect, the first temperature comparison circuit is composed of a first comparator which outputs a high level signal when the temperature detection voltage and the first reference voltage supplied thereto indicate that the temperature of the object is higher than the upper limit of the suitable temperature range and outputs a low level signal when the temperature detection voltage and the first reference voltage indicate that the temperature of the object is lower than the upper limit of the suitable temperature range, and the second temperature comparison circuit is composed of a second comparator which outputs a high level signal when the temperature detection voltage and the second reference voltage supplied thereto indicate that the temperature of the object is higher than the lower limit of the suitable temperature range and outputs a low level signal when the temperature detection voltage and the second reference voltage indicate that the temperature of the object is lower than the lower limit of the suitable temperature range.

In accordance with a seventh aspect of the present invention, in the sixth aspect, the temperature control signal generation circuit includes an EXOR circuit which is supplied with the output signal of the first temperature comparison circuit and the output signal of the second temperature comparison circuit, an AND circuit which is supplied with the output of the EXOR circuit and the inverted output of a second monostable multivibrator, a first monostable multivibrator which is supplied with the output of the AND circuit to its clock terminal, the second monostable multivibrator which is supplied with the inverted output of the first monostable multivibrator to its clock terminal, and a NOR circuit which is supplied with the output of the second monostable multivibrator and the output signal of the first temperature comparison circuit.

In accordance with an eighth aspect of the present invention, in the seventh aspect, the temperature control signal generation circuit further includes an OR circuit which is supplied with the output of the NOR circuit and a temperature control ON/OFF signal which is supplied from a temperature control ON/OFF signal generation circuit for setting ON/OFF of the temperature control.

In accordance with a ninth aspect of the present invention, in the sixth aspect, the temperature control signal generation circuit includes an EXOR circuit which is supplied with the output signal of the first temperature comparison circuit and the output signal of the second temperature comparison circuit, an AND circuit which is supplied with the output of the EXOR circuit and the inverted output of a second monostable multivibrator, a first monostable multivibrator which is supplied with the output of the AND circuit to its clock terminal, the second monostable multivibrator which is supplied with the inverted output of the first monostable multivibrator to its clock terminal, and an OR circuit which is supplied with the output of the second monostable multivibrator and the output signal of the first temperature comparison circuit.

In accordance with a tenth aspect of the present invention, in the ninth aspect, the temperature control signal generation circuit further includes a second AND circuit which is supplied with the output of the OR circuit and a temperature control ON/OFF signal which is supplied from a temperature control ON/OFF signal generation circuit for setting ON/OFF of the temperature control.

In accordance with an eleventh aspect of the present invention, in the first aspect, the first temperature comparison circuit is composed of a first comparator which outputs a low level signal when the temperature detection voltage and the first reference voltage supplied thereto indicate that the temperature of the object is higher than the upper limit of the suitable temperature range and outputs a high level signal when the temperature detection voltage and the first reference voltage indicate that the temperature of the object is lower than the upper limit of the suitable temperature range, and the second temperature comparison circuit is composed of a second comparator which outputs a low level signal when the temperature detection voltage and the second reference voltage supplied thereto indicate that the temperature of the object is higher than the lower limit of the suitable temperature range and outputs a high level signal when the temperature detection voltage and the second reference voltage indicate that the temperature of the object is lower than the lower limit of the suitable temperature range.

In accordance with a twelfth aspect of the present invention, in the eleventh aspect, the temperature control signal generation circuit includes an EXOR circuit which is supplied with the output signal of the first temperature comparison circuit and the output signal of the second temperature comparison circuit, an AND circuit which is supplied with the output of the EXOR circuit and the inverted output of a second monostable multivibrator, a first monostable multivibrator which is supplied with the output of the AND circuit to its clock terminal, the second monostable multivibrator which is supplied with the inverted output of the first monostable multivibrator to its clock terminal, and an OR circuit which is supplied with the output of the second monostable multivibrator and the output signal of the second temperature comparison circuit.

In accordance with a thirteenth aspect of the present invention, in the twelfth aspect, the temperature control signal generation circuit further includes a second OR circuit which is supplied with the output of the OR circuit and a temperature control ON/OFF signal which is supplied from a temperature control ON/OFF signal generation circuit for setting ON/OFF of the temperature control.

In accordance with a fourteenth aspect of the present invention, in the eleventh aspect, the temperature control signal generation circuit includes an EXOR circuit which is supplied with the output signal of the first temperature comparison circuit and the output signal of the second temperature comparison circuit, an AND circuit which is supplied with the output of the EXOR circuit and the inverted output of a second monostable multivibrator, a first monostable multivibrator which is supplied with the output of the AND circuit to its clock terminal, the second monostable multivibrator which is supplied with the inverted output of the first monostable multivibrator to its clock terminal, and a NOR circuit which is supplied with the output of the second monostable multivibrator and the output signal of the second temperature comparison circuit.

In accordance with a fifteenth aspect of the present invention, in the fourteenth aspect, the temperature control signal generation circuit further includes a second AND circuit which is supplied with the output of the NOR circuit and a temperature control ON/OFF signal which is supplied from a temperature control ON/OFF signal generation circuit for setting ON/OFF of the temperature control.

In accordance with a sixteenth aspect of the present invention, there is provided a temperature control method comprising a temperature detection step, a first reference voltage generation step, a second reference voltage generation step, a first temperature comparison step, a second temperature comparison step, a temperature control signal generation step, and a temperature control step. In the temperature detection step, a temperature detection circuit detects the temperature of an object and outputs a temperature detection voltage that corresponds to the detected temperature of the object. In the first reference voltage generation step, a first reference voltage generation circuit generates a first reference voltage that corresponds to the upper limit of a predetermined suitable temperature range for the object. In the second reference voltage generation step, a second reference voltage generation circuit generates a second reference voltage that corresponds to the lower limit of the suitable temperature range for the object. In the first temperature comparison step, a first temperature comparison circuit compares the temperature detection voltage with the first reference voltage which has been generated in the first reference voltage generation step. In the second temperature comparison step, a second temperature comparison circuit compares the temperature detection voltage with the second reference voltage which has been generated in the second reference voltage generation step. In the temperature control signal generation step, a temperature control signal generation circuit generates a temperature control signal for controlling ON/OFF of a power supply of a cooler, based on output signals of the first and second temperature comparison circuits. And in the temperature control step, a temperature control circuit sets ON/OFF the power supply of the cooler according to the temperature control signal.

In accordance with a seventeenth aspect of the present invention, in the temperature control signal generation step of the sixteenth aspect, a pulse oscillation signal is generated by a pulse oscillation signal generation circuit of the temperature control signal generation circuit as the temperature control signal in order to alternately change ON/OFF of the power supply of the cooler, when the output signal of the first temperature comparison circuit indicates that the temperature of the object is lower than the upper limit of the suitable temperature range and the output signal of the second temperature comparison circuit indicates that the temperature of the object is higher than the lower limit of the suitable temperature range. When the output signal of the first temperature comparison circuit indicates that the temperature of the object is higher than the upper limit of the suitable temperature range, a temperature control signal for setting the power supply of the cooler ON is generated by the temperature control signal generation circuit. When the output signal of the second temperature comparison circuit indicates that the temperature of the object is lower than the lower limit of the suitable temperature range, a temperature control signal for setting the power supply of the cooler OFF is generated by the temperature control signal generation circuit.

In accordance with an eighteenth aspect of the present invention, in the seventeenth aspect, the duty factor of the pulse oscillation signal outputted by the pulse oscillation signal generation circuit can be varied.

In accordance with a nineteenth aspect of the present invention, in the seventeenth aspect, the temperature control signal is used for setting ON/OFF of power supply to a Peltier chip which is included in the cooler.

In accordance with a twentieth aspect of the present invention, in the sixteenth aspect, the temperature control method further comprises a temperature control ON/OFF signal generation step. In the temperature control ON/OFF signal generation step, a temperature control ON/OFF signal generation circuit outputs a temperature control ON/OFF signal for starting and ending the temperature control of the object to the temperature control signal generation circuit.

BRIEF DESCRIPTION OF THE DRAWINGS

The objects and features of the present invention will become more apparent from the consideration of the following detailed description taken in conjunction with the accompanying drawings, in which:

FIG. 4 is a timing chart showing the operation of the first temperature comparison circuit, the second temperature comparison circuit and the temperature control signal generation circuit of FIG. 3;

FIG. 8 is a timing chart showing the operation of the first temperature comparison circuit, the second temperature comparison circuit and the temperature control signal generation circuit of FIG. 7.

DESCRIPTION OF THE PREFERRED EMBODIMENTS

Figure 1:
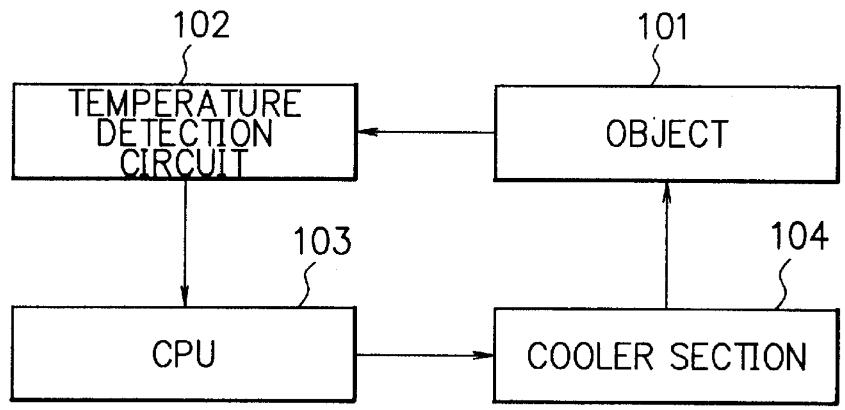
FIG. 1 is a block diagram showing functional blocks of a conventional temperature control circuit.

Referring now to the drawings, a description will be given in detail of preferred embodiments in accordance with the present invention.

Figure 2:
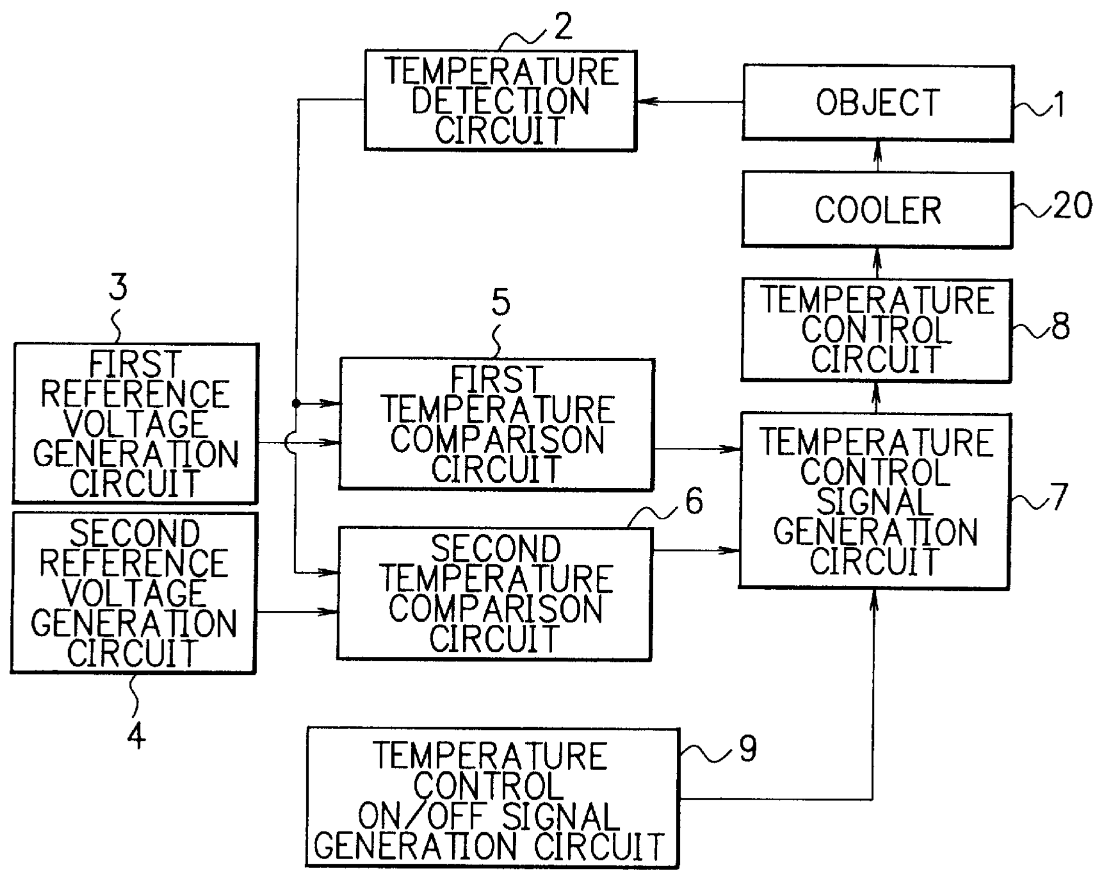
FIG. 2 is a block diagram showing a temperature control circuit according to a first embodiment of the present invention.

FIG. 2 is a block diagram showing a temperature control circuit according to a first embodiment of the present invention. Referring to FIG. 2, the temperature control circuit comprises a temperature detection circuit 2, a first reference voltage generation circuit 3, a second reference voltage generation circuit 4, a first temperature comparison circuit 5, a second temperature comparison circuit 6, a temperature control signal generation circuit 7, a temperature control circuit 8, and a temperature control ON/OFF signal generation circuit 9.

The temperature detection circuit 2, which includes a thermistor etc., detects the temperature of an object 1 and outputs a voltage (temperature detection voltage) that corresponds to the temperature. Incidentally, hereafter, description will be given on the assumption that the temperature detection circuit 2 outputs higher voltage if the temperature of the object 1 becomes higher, that is, on the assumption that the temperature detection circuit 2 has a positive temperature coefficient. The first reference voltage generation circuit 3 generates a first reference voltage that corresponds to the upper limit of a predetermined suitable temperature range for the object 1. The second reference voltage generation circuit 4 generates a second reference voltage that corresponds to the lower limit of the suitable temperature range for the object 1. The first temperature comparison circuit 5 executes comparison between the temperature detection voltage which has been outputted by the temperature detection circuit 2 and the first reference voltage which has been outputted by the first reference voltage generation circuit 3. The second temperature comparison circuit 6 executes comparison between the temperature detection voltage which has been outputted by the temperature detection circuit 2 and the second reference voltage which has been outputted by the second reference voltage generation circuit 4. The temperature control signal generation circuit 7 generates a temperature control signal based on the results of the comparison which has been executed by the first and second temperature comparison circuits 5 and 6. The temperature control signal is used for controlling ON/OFF of a power supply of a cooler 20 which cools the object 1. The temperature control circuit 8 switches ON/OFF the power supply of the cooler 20 according to the temperature control signal which is supplied from the temperature control signal generation circuit 7. The temperature control ON/OFF signal generation circuit 9 starts and ends the temperature control of the object 1.

The cooler 20 includes, for example, a Peltier chip which exhibits Peltier effect for cooling the object 1. An end of the Peltier chip is grounded and the other end of the Peltier chip is applied a voltage (12V, for example) by the power supply of the cooler 20. The Peltier chip cools the object 1 when the power supply of the cooler 20 is ON, and does not cool the object 1 when the power supply is OFF. Incidentally, the expression "switch ON/OFF the power supply of the cooler 20" or "set ON/OFF the power supply of the cooler 20" includes switching or setting ON/OFF a switch which connects the power supply of the cooler 20 and a cooling element (the Peltier chip, for example) of the cooler 20, as well as switching or setting ON/OFF the power supply itself.

In the following, the operation of the temperature control circuit of FIG. 2 will be described briefly. The temperature control circuit of FIG. 2 starts temperature control of the object 1, when a temperature control ON signal is supplied from the temperature control ON/OFF signal generation circuit 9 to the temperature control signal generation circuit 7. Here, the temperature control ON signal is a signal for instructing the temperature control signal generation circuit 7 to start temperature control of the object 1. First, the temperature detection circuit 2 detects the temperature of the object 1, and outputs the temperature detection voltage (a voltage that corresponds to the temperature) to the first temperature comparison circuit 5 and the second temperature comparison circuit 6. The first temperature comparison circuit 5 is also supplied with the first reference voltage from the first reference voltage generation circuit 3, and the second temperature comparison circuit 6 is also supplied with the second reference voltage from the second reference voltage generation circuit 4. Subsequently, the first temperature comparison circuit 5 compares the temperature detection voltage with the first reference voltage, and sends the result of the comparison to the temperature control signal generation circuit 7. As mentioned above, the first reference voltage is a voltage that corresponds to the upper limit of the suitable temperature range for the object 1. Meanwhile, the second temperature comparison circuit 6 compares the temperature detection voltage with the second reference voltage, and sends the result of the comparison to the temperature control signal generation circuit 7. As mentioned above, the second reference voltage is a voltage that corresponds to the lower limit of the suitable temperature range for the object 1. Subsequently, the temperature control signal generation circuit 7 generates the temperature control signal based on the results which has been supplied from the first and second temperature comparison circuits 5 and 6. Subsequently, the temperature control circuit 8 sets the power supply of the cooler 20 ON or OFF according to the temperature control signal which is supplied from the temperature control signal generation circuit 7.

Figure 3:
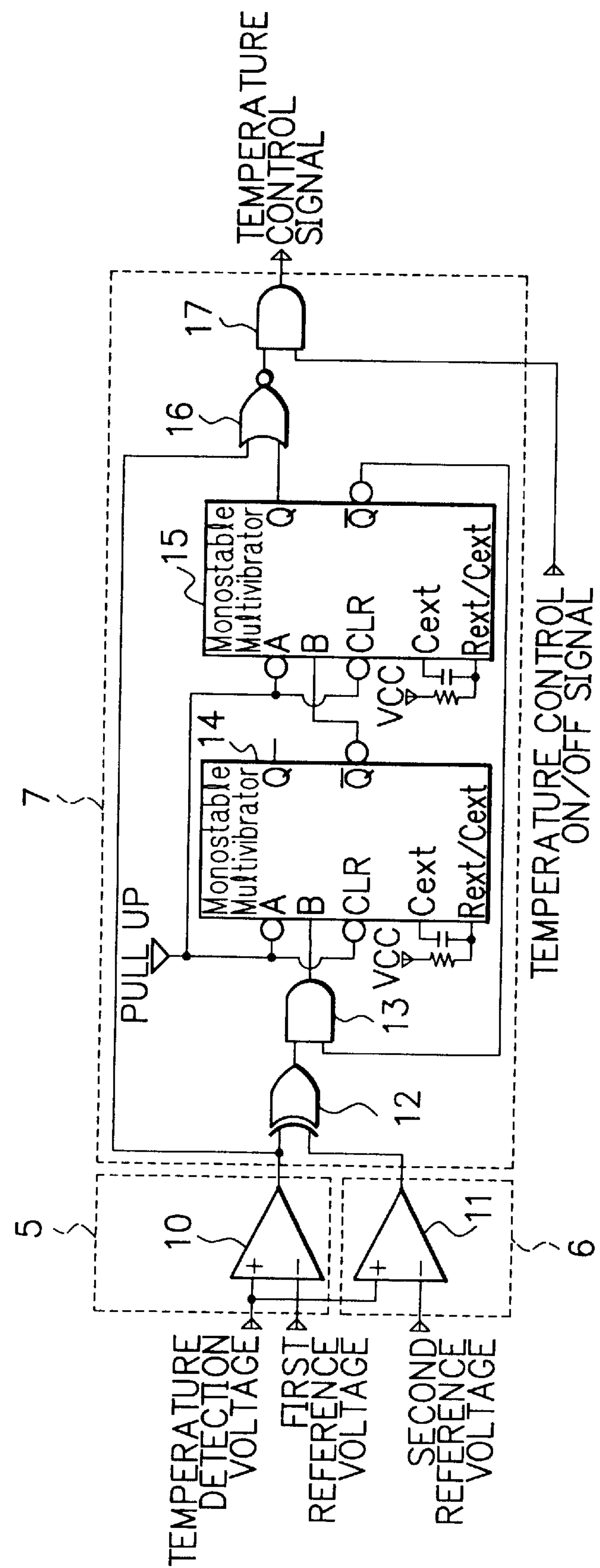
FIG. 3 is a circuit diagram showing an example of internal composition of a first temperature comparison circuit, a second temperature comparison circuit and a temperature control signal generation circuit of the temperature control circuit of FIG. 2.

In the following, the composition and operation of the first temperature comparison circuit 5, the second temperature comparison circuit 6 and the temperature control signal generation circuit 7 will be described referring to FIG. 3. FIG. 3 is a circuit diagram showing an example of internal composition of the first temperature comparison circuit 5, the second temperature comparison circuit 6 and the temperature control signal generation circuit 7 of the first embodiment. Referring to FIG. 3, the first temperature comparison circuit 5 is composed of a comparator 10 which is supplied with the temperature detection voltage and the first reference voltage. The second temperature comparison circuit 6 is composed of a comparator 11 which is supplied with the temperature detection voltage and the second reference voltage. The comparator 10 of the first temperature comparison circuit 5 is supplied with the temperature detection voltage to its positive input terminal and the first reference voltage to its negative input terminal, therefore, the comparator 10 switches its output signal from HIGH to LOW when the temperature detection voltage becomes lower than the first reference voltage. In the same way, the comparator 11 of the second temperature comparison circuit 6 switches its output signal from HIGH to LOW when the temperature detection voltage becomes lower than the second reference voltage.

The temperature control signal generation circuit 7 is composed of an EXOR (exclusive-OR) circuit 12, an AND circuit 13, a first monostable multivibrator 14, a second monostable multivibrator 15, a NOR circuit 16, and an OR circuit 17.

Each of the monostable multivibrators 14 and 15 is a monostable multivibrator of a model "74LS123" which is available on the market. The monostable multivibrator outputs a convex pulse (a rising edge and a falling edge) from its Q-output terminal and a concave pulse (a falling edge and a rising edge) from its Q-bar-output terminal (i.e. the inverted output terminal) when a rising edge is supplied to its B-clock terminal. The width of the pulse outputted by the monostable multivibrator can be varied and adjusted by varying the resistance of a resistor and the capacitance of a capacitor which are connected to the Cext terminal and the Rext/Cext terminal of the monostable multivibrator.

The EXOR circuit 12 is supplied with the output signal of the first temperature comparison circuit 5 and the output signal of the second temperature comparison circuit 6. The AND circuit 13 is supplied with the output of the EXOR circuit 12 and the inverted output of the second monostable multivibrator 15. The first monostable multivibrator 14 is supplied with the output of the AND circuit 13 to its B-clock terminal. The second monostable multivibrator 15 is supplied with the inverted output of the first monostable multivibrator 14 to its B-clock terminal. The NOR circuit 16 is supplied with the output of the second monostable multivibrator 15 and the output signal of the first temperature comparison circuit 5. The OR circuit 17 is supplied with the output of the NOR circuit 16 and the temperature control ON/OFF signal from the temperature control ON/OFF signal generation circuit 9. The output of the OR circuit 17 is supplied to the temperature control circuit 8 as the temperature control signal.

In the following, the operation of the temperature control signal generation circuit 7 of FIG. 3 will be described referring to FIG. 4. FIG. 4 is a timing chart showing the operation of the first temperature comparison circuit 5, the second temperature comparison circuit 6 and the temperature control signal generation circuit 7. Referring to FIG. 4, the temperature detection circuit 2 starts detecting the temperature of the object 1 when the temperature control ON signal is supplied from the temperature control ON/OFF signal generation circuit 9 (that is, when the temperature control ON/OFF signal supplied from the temperature control ON/OFF signal generation circuit 9 is switched to LOW). The temperature detection circuit 2 outputs the temperature detection voltage corresponding to the detected temperature to the first temperature comparison circuit 5 and the second temperature comparison circuit 6. The first temperature comparison circuit 5 compares the temperature detection voltage with the first reference voltage which is supplied from the first reference voltage generation circuit 3, and the second temperature comparison circuit 6 compares the temperature detection voltage with the second reference voltage which is supplied from the second reference voltage generation circuit 4.

In the period T0 which is shown in FIG. 4, the temperature detection voltage is higher than the first reference voltage, therefore, the output signal of the first temperature comparison circuit 5 remains HIGH. The output signal of the second temperature comparison circuit 6 is also HIGH. The high level output signal of the first temperature comparison circuit 5 is supplied to the NOR circuit 16, therefore, the output of the NOR circuit 16 becomes LOW The OR circuit 17 is supplied with the low level output of the NOR circuit 16 and the low level temperature control ON/OFF signal from the temperature control ON/OFF signal generation circuit 9. Therefore, in the period T0, the output of the OR circuit 17 is kept LOW, and the low level signal is outputted from the temperature control signal generation circuit 7 to the temperature control circuit 8 as the temperature control signal. The low level temperature control signal is a signal for setting the power supply of the cooler 20 ON, therefore, the cooler 20 keeps on cooling the object 1 in the period T0.

In the period T1 which is shown in FIG. 4, the temperature detection voltage is lower than the first reference voltage and higher than the second reference voltage, therefore, the output signal of the first temperature comparison circuit 5 is switched to LOW and the output signal of the second temperature comparison circuit 6 remains HIGH. The output signals of the first and second temperature comparison circuits 5 and 6 are supplied to the temperature control signal generation circuit 7. The low level output signal of the first temperature comparison circuit 5 is inputted to the NOR circuit 16, therefore, the NOR circuit 16 operates as an inverter gate in the period T1.

The low level output signal of the first temperature comparison circuit 5 is also supplied to the EXOR circuit 12. The EXOR circuit 12 outputs a high level signal to the AND circuit 13, since the output signal of the first temperature comparison circuit 5 is LOW and the output signal of the second temperature comparison circuit 6 is HIGH. Since the output of the EXOR circuit 12 is HIGH, the AND circuit 13 directly connects the Q-bar-output terminal of the second monostable multivibrator 15 and the B-clock terminal of the first monostable multivibrator 14 in the period T1. As a result, a pulse oscillation signal which is shown in FIG. 4 is outputted from the Q-output terminal (i.e. the non-inverted output terminal) of the second monostable multivibrator 15. As mentioned above, the NOR circuit 16 operates as an inverter gate in the period T1. The OR circuit 17, which is supplied with the low level temperature control ON/OFF signal, passes the output of the NOR circuit 16 untouched. Therefore, the pulse oscillation signal outputted by the second monostable multivibrator 15 is inverted by the NOR circuit 16 and outputted from the temperature control signal generation circuit 7 as the temperature control signal. The power supply of the cooler 20 is set ON by the temperature control circuit 8 when the temperature control signal is LOW, and the power supply is set OFF by the temperature control circuit 8 when the temperature control signal is HIGH. Consequently, the cooler 20 executes cooling of the object 1 with low efficiency in the period T1.

In the period T2 which is shown in FIG. 4, the temperature detection voltage is lower than the first reference voltage and also lower than the second reference voltage, therefore, the output signal of the first temperature comparison circuit 5 remains LOW and the output signal of the second temperature comparison circuit 6 is switched to LOW. The output signals of the first and second temperature comparison circuits 5 and 6 are supplied to the temperature control signal generation circuit 7. The EXOR circuit 12 is supplied with the low level output signal of the first temperature comparison circuit 5 and the low level output signal of the second temperature comparison circuit 6, therefore, the EXOR circuit 12 outputs a low level signal to the AND circuit 13. The AND circuit 13, which is supplied with the low level signal, constantly outputs a low level signal to the first monostable multivibrator 14 regardless of the Q-bar-output of the second monostable multivibrator 15. Therefore, the second monostable multivibrator 15 outputs no pulses, and the Q-output of the second monostable multivibrator 15 is kept LOW in the period T2, as shown in FIG. 4. The NOR circuit 16, which is supplied with the low level output signal from the first temperature comparison circuit 5, operates as an inverter gate in the period T2, and the OR circuit 17, which is supplied with the low level temperature control ON/OFF signal, passes the output of the NOR circuit 16 untouched. Therefore, in the period T2, a high level signal is outputted from the temperature control signal generation circuit 7 as the temperature control signal, and thus the power supply of the cooler 20 is set OFF by the temperature control circuit 8. In the periods T3~T8 which are shown in FIG. 4, the temperature control signal generation circuit 7 operates in the same way as the above description (the periods T1 and T2), and thus repeated description thereof is omitted.

In the period T9 which is shown in FIG. 4, when the temperature control OFF signal is supplied from the temperature control ON/OFF signal generation circuit 9 (that is, when the temperature control ON/OFF signal supplied from the temperature control ON/OFF signal generation circuit 9 becomes HIGH), the OR circuit 17 outputs a high level signal regardless of the output of the NOR circuit 16. Therefore, the high level temperature control signal is supplied from the temperature control signal generation circuit 7 to the temperature control circuit 8, and the power supply of the cooler 20 is set OFF regardless of the temperature of the object 1.

As described above, by the temperature control circuit according to the first embodiment, the power supply of the cooler 20 is set ON when the temperature detected by the temperature detection circuit 2 is higher than the upper limit of the suitable temperature range, switched between ON and OFF when the temperature detected by the temperature detection circuit 2 is in the suitable temperature range, and is set OFF when the temperature detected by the temperature detection circuit 2 is lower than the lower limit of the suitable temperature range.

Therefore, undershoot (temperature too low) can be reduced in the temperature control, and precise temperature control of the object 1 can be executed. The precise temperature control of the object 1 is performed only by the temperature control circuit (that is, by hardware) without use of software. Therefore, there is no need to employ a CPU for executing the precise temperature control of the object 1. In the case where the temperature control circuit is installed in a system which is provided with a CPU (a car etc.), the temperature control of the object 1 can be executed without burdening the CPU, and thus there is no need to upgrade the CPU nor add an extra CPU only for the execution of the temperature control.

The duty factor (or the duty cycle) of the pulse oscillation signal outputted by the second monostable multivibrator 15 can be varied by varying the balance between the pulse width of the first monostable multivibrator 14 and the pulse width of the second monostable multivibrator 15. As mentioned before, the pulse width of the monostable multivibrator can be varied and adjusted by varying the resistance of the resistor and the capacitance of the capacitor which are connected to the Cext terminal and the Rext/Cext terminal of the monostable multivibrator. By adequately setting the duty factor of the pulse oscillation signal outputted by the second monostable multivibrator 15, the undershoot of temperature control can be reduced further. On the other hand, it is also possible to reduce overshoot of temperature control by setting the duty factor of the pulse oscillation signal outputted by the second monostable multivibrator 15 reversely.

Figure 5:
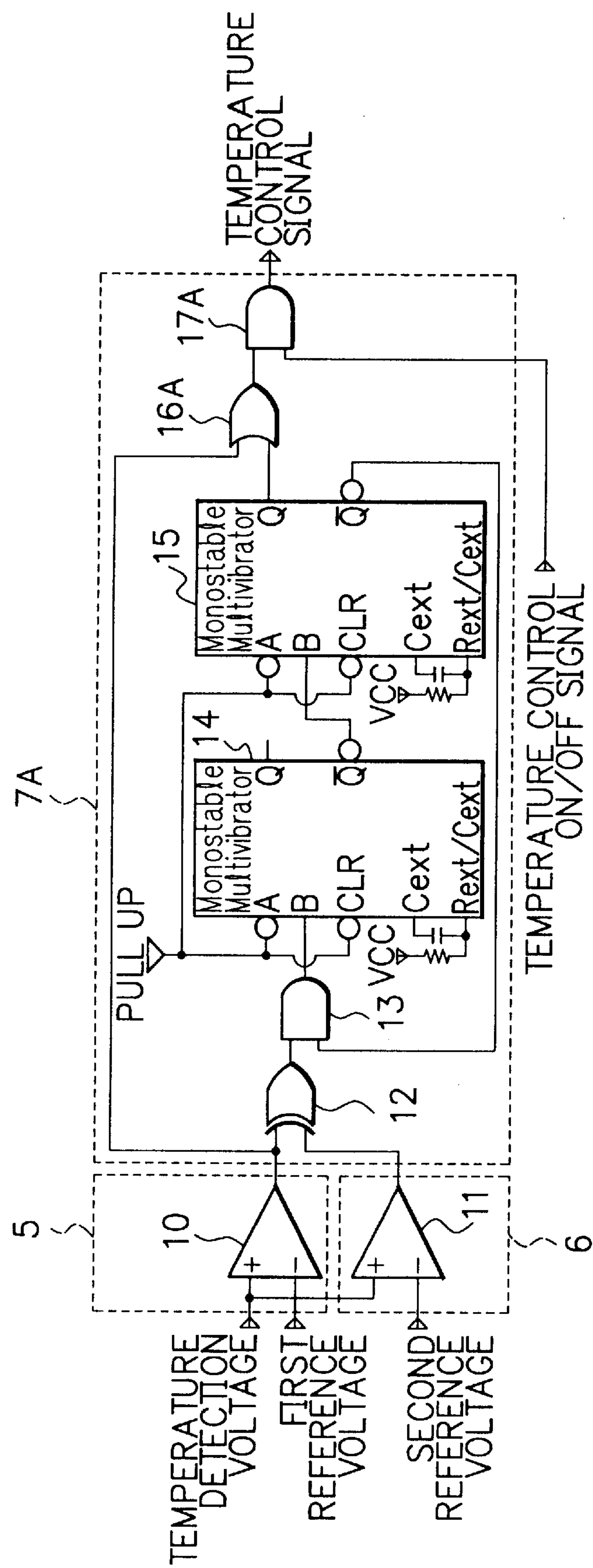
FIG. 5 is a circuit diagram showing another temperature control signal generation circuit which can be employed instead of the temperature control signal generation circuit of FIG. 3.

Incidentally, while the power supply of the cooler 20 was set ON when the temperature control signal outputted by the temperature control signal generation circuit 7 is LOW in the above first embodiment, it is also possible to design the temperature control circuit of the first embodiment so that the temperature control circuit 8 will set ON the power supply of the cooler 20 when the temperature control signal is HIGH. FIG. 5 is a circuit diagram showing another temperature control signal generation circuit 7A which can be employed instead of the temperature control signal generation circuit 7 of the first embodiment. Referring to FIG. 5, an OR circuit 16A is provided in place of the NOR circuit 16 of FIG. 3, and an AND circuit 17A is provided in place of the OR circuit 17 of FIG. 3. In this example, the temperature control ON/OFF signal generation circuit 9 outputs a high level signal as the temperature control ON signal, and outputs a low level signal as the temperature control OFF signal, oppositely to the above first embodiment. In the case where the temperature control ON/OFF signal is HIGH (temperature control ON), the temperature control signal generation circuit 7A operates as follows. When the temperature of the object 1 is higher than the upper limit of the suitable temperature range, the OR circuit 16A is supplied with a high level output signal from the first temperature comparison circuit 5, therefore, the OR circuit 16A outputs a high level signal, and the AND circuit 17A, which is supplied with the temperature control ON signal, outputs a high level signal as the temperature control signal, and thus the cooler 20 is set ON. When the temperature of the object 1 is between the upper limit and the lower limit of the suitable temperature range, a pulse oscillation signal is outputted from the temperature control signal generation circuit 7A as the temperature control signal, and thus the cooler 20 executes cooling with low efficiency. When the temperature of the object 1 is lower than the lower limit of the suitable temperature range, the OR circuit 16A is supplied with two low level signals, and outputs a low level signal to the AND circuit 17A, therefore, a low level signal is outputted from the AND circuit 17A as the temperature control signal, and thus the cooler 20 is set OFF. Therefore, the same effects as those of the above first embodiment can be obtained by this example.

Figure 6:
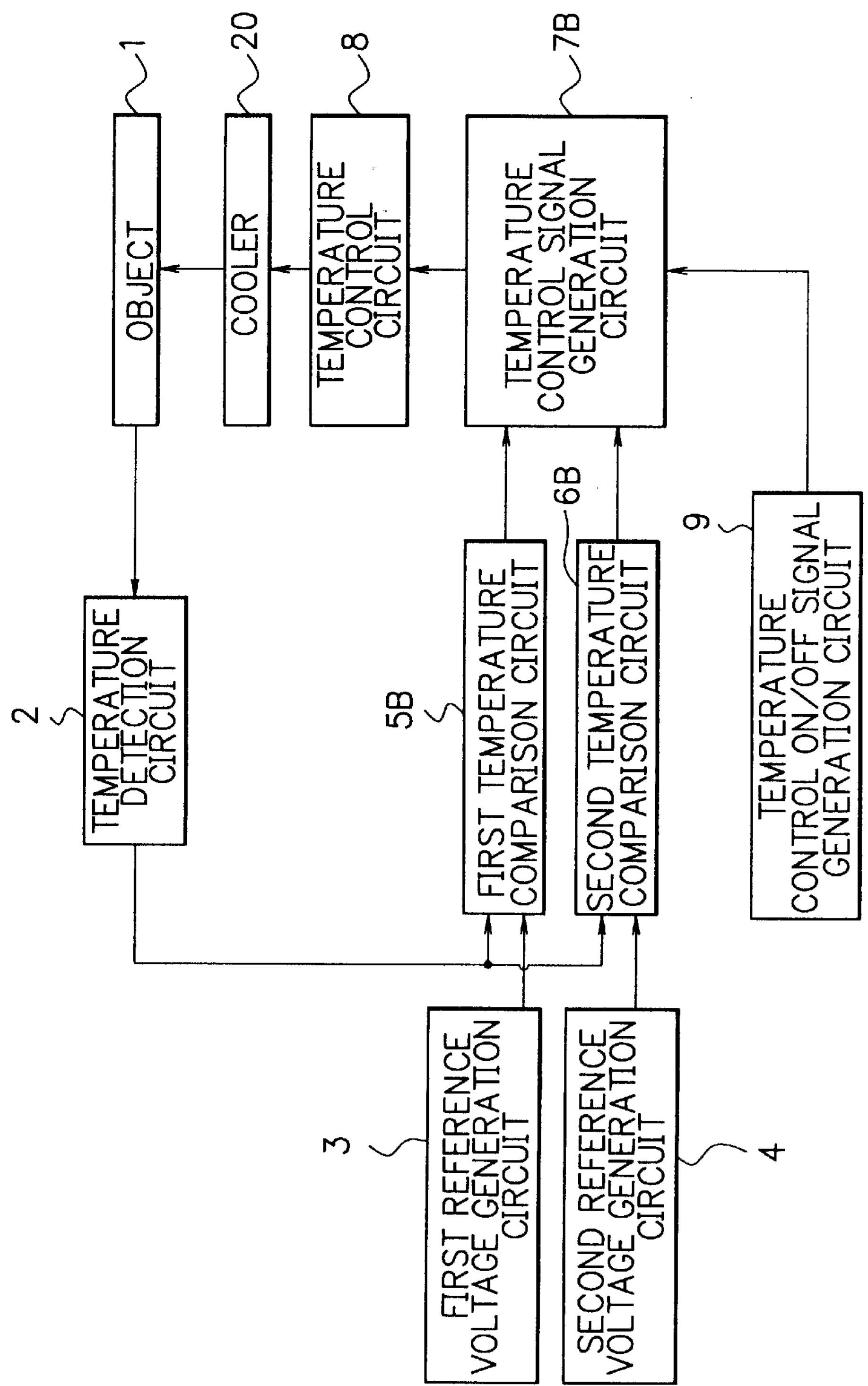
FIG. 6 is a block diagram showing a temperature control circuit according to a second embodiment of the present invention.

FIG. 6 is a block diagram showing a temperature control circuit according to a second embodiment of the present invention. Referring to FIG. 6, the temperature control circuit comprises a temperature detection circuit 2, a first reference voltage generation circuit 3, a second reference voltage generation circuit 4, a first temperature comparison circuit 5B, a second temperature comparison circuit 6B, a temperature control signal generation circuit 7B, a temperature control circuit 8, and a temperature control ON/OFF signal generation circuit 9.

The components of the temperature control circuit of the second embodiment other than the first temperature comparison circuit 5B, the second temperature comparison circuit 6B and the temperature control signal generation circuit 7B are the same as those of the first embodiment which have been shown in FIG. 2, and operate in the same way as the first embodiment. Incidentally, in the second embodiment, description will be given on the assumption that the temperature detection circuit 2 outputs higher voltage if the temperature of the object 1 becomes higher, that is, on the assumption that the temperature detection circuit 2 has a positive temperature coefficient, in the same way as the temperature detection circuit 2 of the first embodiment. The first temperature comparison circuit 5B executes comparison between the temperature detection voltage which has been outputted by the temperature detection circuit 2 and the first reference voltage (corresponding to the upper limit of the suitable temperature range) which has been outputted by the first reference voltage generation circuit 3. The first temperature comparison circuit 5B of the second embodiment outputs a low level output signal if the temperature detection voltage is higher than the first reference voltage, and outputs a high level output signal if the temperature detection voltage is lower than the first reference voltage, oppositely to the first temperature comparison circuit 5 of the first embodiment. The second temperature comparison circuit 6B executes comparison between the temperature detection voltage which has been outputted by the temperature detection circuit 2 and the second reference voltage (corresponding to the lower limit of the suitable temperature range) which has been outputted by the second reference voltage generation circuit 4. The second temperature comparison circuit 6B of the second embodiment outputs a low level output signal if the temperature detection voltage is higher than the second reference voltage, and outputs a high level output signal if the temperature detection voltage is lower than the second reference voltage, oppositely to the second temperature comparison circuit 6 of the first embodiment. The temperature control signal generation circuit 7B generates a temperature control signal based on the results of the comparison which has been executed by the first and second temperature comparison circuits 5B and 6B.

Figure 7:
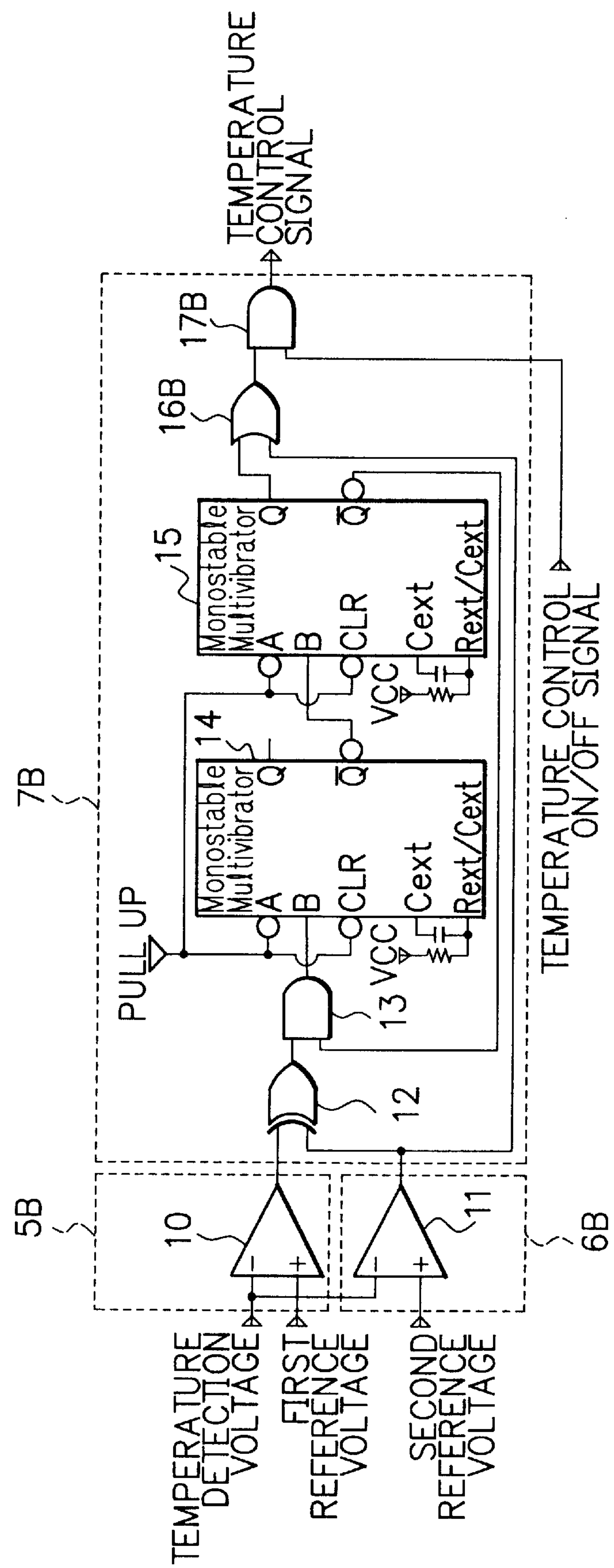
FIG. 7 is a circuit diagram showing an example of internal composition of a first temperature comparison circuit, a second temperature comparison circuit and a temperature control signal generation circuit of the temperature control circuit of FIG. 6.

In the following, the composition and operation of the first temperature comparison circuit 5B, the second temperature comparison circuit 6B and the temperature control signal generation circuit 7B of the second embodiment will be described referring to FIG. 7. FIG. 7 is a circuit diagram showing an example of internal composition of the first temperature comparison circuit 5B, the second temperature comparison circuit 6B and the temperature control signal generation circuit 7B of the second embodiment. Referring to FIG. 7, the first temperature comparison circuit 5B is composed of a comparator 10, in the same way as the first temperature comparison circuit 5 of the first embodiment. However, in the first temperature comparison circuit 5B, the temperature detection voltage is supplied to the negative input terminal of the comparator 10, and the first reference voltage is supplied to the positive input terminal of the comparator 10. Therefore, the first temperature comparison circuit 5B (the comparator 10) outputs a low level output signal if the temperature detection voltage is higher than the first reference voltage, that is, if the temperature of the object 1 is higher than the upper limit of the suitable temperature range, and vice versa. In the same way, in the second temperature comparison circuit 6B, the temperature detection voltage is supplied to the negative input terminal of the comparator 11, and the second reference voltage is supplied to the positive input terminal of the comparator 11. Therefore, the second temperature comparison circuit 6B (the comparator 11) outputs a low level output signal if the temperature detection voltage is higher than the second reference voltage, that is, if the temperature of the object 1 is higher than the lower limit of the suitable temperature range, and vice versa.

The temperature control signal generation circuit 7B of the second embodiment is composed of an EXOR (exclusive-OR) circuit 12, an AND circuit 13, a first monostable multivibrator 14, a second monostable multivibrator 15, an OR circuit 16B, and an OR circuit 17. The components of the temperature control signal generation circuit 7B of the second embodiment other than the OR circuit 16B is the same as those of the temperature control signal generation circuit 7 of the first embodiment. Each of the monostable multivibrators 14 and 15 is a monostable multivibrator of a model "74LS123", in the same way as the first embodiment. The monostable multivibrator outputs a convex pulse (a rising edge and a falling edge) from its Q-output terminal and a concave pulse (a falling edge and a rising edge) from its Q-bar-output terminal (i.e. the inverted output terminal) when a rising edge is supplied to its B-clock terminal.

The EXOR circuit 12 is supplied with the output signals of the first and second temperature comparison circuits 5B and 6B. The AND circuit 13 is supplied with the output of the EXOR circuit 12 and the inverted output of the second monostable multivibrator 15. The first monostable multivibrator 14 is supplied with the output of the AND circuit 13 to its B-clock terminal. The second monostable multivibrator 15 is supplied with the inverted output of the first monostable multivibrator 14 to its B-clock terminal. The OR circuit 16B is supplied with the output of the second monostable multivibrator 15 and the output signal of the second temperature comparison circuit 6B. The OR circuit 17 is supplied with the output of the OR circuit 16B and the temperature control ON/OFF signal from the temperature control ON/OFF signal generation circuit 9. The output of the OR circuit 17 is supplied to the temperature control circuit 8 as the temperature control signal.

In the following, the operation of the temperature control signal generation circuit 7B of FIG. 7 will be described referring to FIG. 8. FIG. 8 is a timing chart showing the operation of the first temperature comparison circuit 5B, the second temperature comparison circuit 6B and the temperature control signal generation circuit 7B of the second embodiment. Referring to FIG. 8, the temperature detection circuit 2 starts detecting the temperature of the object 1 when the temperature control ON signal is supplied from the temperature control ON/OFF signal generation circuit 9 (that is, when the temperature control ON/OFF signal supplied from the temperature control ON/OFF signal generation circuit 9 is switched to LOW). The temperature detection circuit 2 outputs the temperature detection voltage corresponding to the detected temperature to the first temperature comparison circuit 5B and the second temperature comparison circuit 6B. The first temperature comparison circuit 5B compares the temperature detection voltage with the first reference voltage which is supplied from the first reference voltage generation circuit 3, and the second temperature comparison circuit 6B compares the temperature detection voltage with the second reference voltage which is supplied from the second reference voltage generation circuit 4.

In the period T0 which is shown in FIG. 8, the temperature detection voltage is higher than the first reference voltage, therefore, the output signal of the first temperature comparison circuit 5B remains LOW. The output signal of the second temperature comparison circuit 6B is also LOW. The output signals of the first and second temperature comparison circuits 5B and 6B are supplied to the temperature control signal generation circuit 7B. The EXOR circuit 12 is supplied with the low level output signal of the first temperature comparison circuit 5B and the low level output signal of the second temperature comparison circuit 6B, therefore, the EXOR circuit 12 outputs a low level signal to the AND circuit 13. The AND circuit 13, which is supplied with the low level signal, constantly outputs a low level signal to the first monostable multivibrator 14 regardless of the Q-bar-output of the second monostable multivibrator 15. Therefore, the second monostable multivibrator 15 outputs no pulses, and the Q-output of the second monostable multivibrator 15 is kept LOW in the period TO, as shown in FIG. 8. The OR circuit 16B, which is supplied with the low level output signal from the second temperature comparison circuit 6B passes signals untouched, and the OR circuit 17, which is supplied with the low level temperature control ON/OFF signal, also passes signals untouched. Therefore, in the period TO, a low level signal is outputted from the temperature control signal generation circuit 7B as the temperature control signal, and the power supply of the cooler 20 is set ON by the temperature control circuit 8, and thereby the cooler 20 keeps on cooling the object 1.

In the period T1 which is shown in FIG. 8, the temperature detection voltage is lower than the first reference voltage and higher than the second reference voltage, therefore, the output signal of the first temperature comparison circuit 5B is switched to HIGH and the output signal of the second temperature comparison circuit 6B remains LOW. The output signals of the first and second temperature comparison circuits 5B and 6B are supplied to the temperature control signal generation circuit 7B. The low level output signal of the second temperature comparison circuit 6B is inputted to the OR circuit 16B, therefore, the OR circuit 16B passes signals from the second monostable multivibrator 15 untouched in the period T1.

The EXOR circuit 12 outputs a high level signal to the AND circuit 13, since the output signal of the first temperature comparison circuit SB is HIGH and the output signal of the second temperature comparison circuit 6B is LOW. Since the output of the EXOR circuit 12 is HIGH, the AND circuit 13 directly connects the Q-bar-output terminal of the second monostable multivibrator 15 and the B-clock terminal of the first monostable multivibrator 14 in the period T1. As a result, a pulse oscillation signal which is shown in FIG. 8 is outputted from the Q-output terminal (i.e. the non-inverted output terminal) of the second monostable multivibrator 15. As mentioned above, the OR circuit 16B passes signals from the second monostable multivibrator 15 untouched in the period T1. The OR circuit 17, which is supplied with the low level temperature control ON/OFF signal, also passes the output of the OR circuit 16B untouched. Therefore, the pulse oscillation signal outputted by the second monostable multivibrator 15 is outputted from the temperature control signal generation circuit 7B as the temperature control signal. The power supply of the cooler 20 is set ON by the temperature control circuit 8 when the temperature control signal is LOW, and the power supply is set OFF by the temperature control circuit 8 when the temperature control signal is HIGH. Consequently, the cooler 20 executes cooling of the object 1 with low efficiency in the period T1.

In the period T2 which is shown in FIG. 8, the temperature detection voltage is lower than the first reference voltage and also lower than the second reference voltage, therefore, the output signal of the first temperature comparison circuit 5B remains HIGH and the output signal of the second temperature comparison circuit 6B is switched to HIGH. The high level output signal of the second temperature comparison circuit 6B is supplied to the OR circuit 16B, therefore, the output of the OR circuit 16B becomes HIGH. The OR circuit 17 is supplied with the high level output of the OR circuit 16B and the low level temperature control ON/OFF signal from the temperature control ON/OFF signal generation circuit 9. Therefore, in the period T2, the output of the OR circuit 17 is kept HIGH, and the high level signal is outputted from the temperature control signal generation circuit 7B to the temperature control circuit 8 as the temperature control signal. The high level temperature control signal is a signal for setting the power supply of the cooler 20 OFF, therefore, the cooler 20 is set OFF in the period T2.

In the periods T3~T8 which are shown in FIG. 8, the temperature control signal generation circuit 7B operates in the same way as the above description (the periods T1 and T2), and thus repeated description thereof is omitted.

In the period T9 which is shown in FIG. 8, when the temperature control OFF signal is supplied from the temperature control ON/OFF signal generation circuit 9 (that is, when the temperature control ON/OFF signal supplied from the temperature control ON/OFF signal generation circuit 9 becomes HIGH), the OR circuit 17 outputs a high level signal regardless of the output of the OR circuit 16B. Therefore, the high level temperature control signal is supplied from the temperature control signal generation circuit 7B to the temperature control circuit 8, and the power supply of the cooler 20 is set OFF regardless of the temperature of the object 1.

As described above, by the temperature control circuit according to the second embodiment, the same effects as those of the first embodiment can be obtained, Also in the second embodiment, the duty factor of the pulse oscillation signal outputted by the second monostable multivibrator 15 can be varied by varying the balance between the pulse width of the first monostable multivibrator 14 and the pulse width of the second monostable multivibrator 15, and thus either undershoot or overshoot of the temperature control can be reduced further by adequately setting the duty factor.

Figure 9:
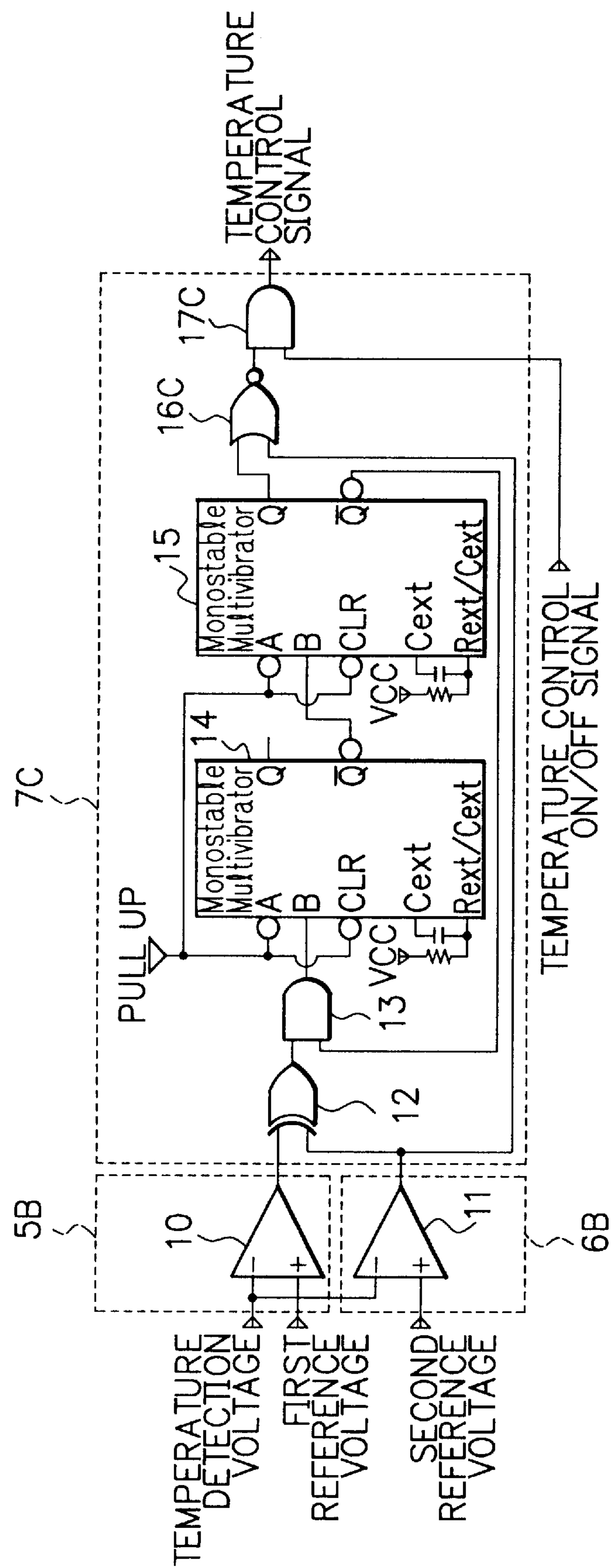
FIG. 9 is a circuit diagram showing another temperature control signal generation circuit which can be employed instead of the temperature control signal generation circuit of FIG. 7.

Incidentally, while the power supply of the cooler 20 was set ON when the temperature control signal outputted by the temperature control signal generation circuit 7B is LOW in the above second embodiment, it is also possible to design the temperature control circuit of the second embodiment so that the temperature control circuit 8 will set ON the power supply of the cooler 20 when the temperature control signal is HIGH. FIG. 9 is a circuit diagram showing another temperature control signal generation circuit 7C which can be employed instead of the temperature control signal generation circuit 7B of the second embodiment. Referring to FIG. 9, a NOR circuit 16C is provided in place of the OR circuit 16B of FIG. 7, and an AND circuit 17C is provided in place of the OR circuit 17 of FIG. 7. In this example, the temperature control ON/OFF signal generation circuit 9 outputs a high level signal as the temperature control ON signal, and outputs a low level signal as the temperature control OFF signal, oppositely to the above second embodiment. In the case where the temperature control ON/OFF signal is HIGH (temperature control ON), the temperature control signal generation circuit 7C operates as follows. When the temperature of the object 1 is higher than the upper limit of the suitable temperature range, the NOR circuit 16C is supplied with two low level signals and outputs a high level signal to the AND circuit 17C, therefore, a high level signal is outputted from the AND circuit 17C as the temperature control signal, and thus the cooler 20 is set ON. When the temperature of the object 1 is between the upper limit and the lower limit of the suitable temperature range, a pulse oscillation signal is outputted from the temperature control signal generation circuit 7C as the temperature control signal, and thus the cooler 20 executes cooling with low efficiency. When the temperature of the object 1 is lower than the lower limit of the suitable temperature range, the NOR circuit 16C is supplied with a high level output signal from the second temperature comparison circuit 6B, therefore, the NOR circuit 16C outputs a low level signal, and a low level signal is outputted from the AND circuit 17C as the temperature control signal, and thus the cooler is set OFF. Therefore, the same effects as those of the above second embodiment can be obtained by this example.

In addition, although the description on the above embodiments has been given on the assumption that the temperature detection circuit 2 has a positive temperature coefficient, it is of course possible to employ a temperature detection circuit 2 which has a negative temperature coefficient. In such cases, the temperature detection voltage from such a temperature detection circuit 2 should be inputted to the negative input terminals of the comparators 10 and 11 in FIG. 3 and FIG. 5, and should be inputted to the positive input terminals of the comparators 10 and 11 in FIG. 7 and FIG. 9.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A temperature control circuit comprising:

a temperature detection circuit for detecting the temperature of an object and outputting a temperature detection voltage that corresponds to the detected temperature of the object;

a first reference voltage generation circuit for generating a first reference voltage that corresponds to the upper limit of a predetermined suitable temperature range for the object;

a second reference voltage generation circuit for generating a second reference voltage that corresponds to the lower limit of the suitable temperature range for the object;

a first temperature comparison circuit which is supplied with the temperature detection voltage from the temperature detection circuit and the first reference voltage from the first reference voltage generation circuit and executes comparison between the two voltages;

a second temperature comparison circuit which is supplied with the temperature detection voltage from the temperature detection circuit and the second reference voltage from the second reference voltage generation circuit and executes comparison between the two voltages;

a temperature control signal generation circuit which is supplied with output signals of the first and second temperature comparison circuits which represent the results of the comparison and generates a temperature control signal for controlling ON/OFF of a power supply of a cooler based on the results of the comparison; and a temperature control circuit for setting ON/OFF the power supply of the cooler according to the temperature control signal.

2. A temperature control circuit as claimed in claim 1, wherein the temperature control signal generation circuit includes a pulse oscillation signal generation circuit which outputs a pulse oscillation signal as the temperature control signal in order to alternately change ON/OFF of the power supply of the cooler, when the output signal of the first temperature comparison circuit indicates that the temperature of the object is lower than the upper limit of the suitable temperature range and the output signal of the second temperature comparison circuit indicates that the temperature of the object is higher than the lower limit of the suitable temperature range, and the temperature control signal generation circuit outputs the temperature control signal for setting the power supply of the cooler ON when the output signal of the first temperature comparison circuit indicates that the temperature of the object is higher than the upper limit of the suitable temperature range, and outputs the temperature control signal for setting the power supply of the cooler OFF when the output signal of the second temperature comparison circuit indicates that the temperature of the object is lower than the lower limit of the suitable temperature range.

3. A temperature control circuit as claimed in claim 2, wherein the duty factor of the pulse oscillation signal outputted by the pulse oscillation signal generation circuit can be varied.

4. A temperature control circuit as claimed in claim 2, wherein the temperature control signal is used for setting ON/OFF of power supply to a Peltier chip which is included in the cooler.

5. A temperature control circuit as claimed in claim 1, further comprising a temperature control ON/OFF signal generation circuit for outputting a temperature control ON/OFF signal for starting and ending the temperature control of the object to the temperature control signal generation circuit.

6. A temperature control circuit as claimed in claim 1, wherein:

the first temperature comparison circuit is composed of a first comparator which outputs a high level signal when the temperature detection voltage and the first reference voltage supplied thereto indicate that the temperature of the object is higher than the upper limit of the suitable temperature range and outputs a low level signal when the temperature detection voltage and the first reference voltage indicate that the temperature of the object is lower than the upper limit of the suitable temperature range, and the second temperature comparison circuit is composed of a second comparator which outputs a high level signal when the temperature detection voltage and the second reference voltage supplied thereto indicate that the temperature of the object is higher than the lower limit of the suitable temperature range and outputs a low level signal when the temperature detection voltage and the second reference voltage indicate that the temperature of the object is lower than the lower limit of the suitable temperature range.

7. A temperature control circuit as claimed in claim 6, wherein the temperature control signal generation circuit includes:

an EXOR circuit which is supplied with the output signal of the first temperature comparison circuit and the output signal of the second temperature comparison circuit;

an AND circuit which is supplied with the output of the EXOR circuit and the inverted output of a second monostable multivibrator;

a first monostable multivibrator which is supplied with the output of the AND circuit to its clock terminal;

the second monostable multivibrator which is supplied with the inverted output of the first monostable multivibrator to its clock terminal; and a NOR circuit which is supplied with the output of the second monostable multivibrator and the output signal of the first temperature comparison circuit.

8. A temperature control circuit as claimed in claim 7, wherein the temperature control signal generation circuit further includes an OR circuit which is supplied with the output of the NOR circuit and a temperature control ON/OFF signal which is supplied from a temperature control ON/OFF signal generation circuit for setting ON/OFF of the temperature control.

9. A temperature control circuit as claimed in claim 6, wherein the temperature control signal generation circuit includes:

an EXOR circuit which is supplied with the output signal of the first temperature comparison circuit and the output signal of the second temperature comparison circuit;

an AND circuit which is supplied with the output of the EXOR circuit and the inverted output of a second monostable multivibrator;

a first monostable multivibrator which is supplied with the output of the AND circuit to its clock terminal;

the second monostable multivibrator which is supplied with the inverted output of the first monostable multivibrator to its clock terminal; and an OR circuit which is supplied with the output of the second monostable multivibrator and the output signal of the first temperature comparison circuit.

10. A temperature control circuit as claimed in claim 9, wherein the temperature control signal generation circuit further includes a second AND circuit which is supplied with the output of the OR circuit and a temperature control ON/OFF signal which is supplied from a temperature control ON/OFF signal generation circuit for setting ON/OFF of the temperature control.

11. A temperature control circuit as claimed in claim 1, wherein:

the first temperature comparison circuit is composed of a first comparator which outputs a low level signal when the temperature detection voltage and the first reference voltage supplied thereto indicate that the temperature of the object is higher than the upper limit of the suitable temperature range and outputs a high level signal when the temperature detection voltage and the first reference voltage indicate that the temperature of the object is lower than the upper limit of the suitable temperature range, and the second temperature comparison circuit is composed of a second comparator which outputs a low level signal when the temperature detection voltage and the second reference voltage supplied thereto indicate that the temperature of the object is higher than the lower limit of the suitable temperature range and outputs a high level signal when the temperature detection voltage and the second reference voltage indicate that the temperature of the object is lower than the lower limit of the suitable temperature range.

12. A temperature control circuit as claimed in claim 11, wherein the temperature control signal generation circuit includes:

an EXOR circuit which is supplied with the output signal of the first temperature comparison circuit and the output signal of the second temperature comparison circuit;

an AND circuit which is supplied with the output of the EXOR circuit and the inverted output of a second monostable multivibrator;

a first monostable multivibrator which is supplied with the output of the AND circuit to its clock terminal;

the second monostable multivibrator which is supplied with the inverted output of the first monostable multivibrator to its clock terminal; and an OR circuit which is supplied with the output of the second monostable multivibrator and the output signal of the second temperature comparison circuit.

13. A temperature control circuit as claimed in claim 12, wherein the temperature control signal generation circuit further includes a second OR circuit which is supplied with the output of the OR circuit and a temperature control ON/OFF signal which is supplied from a temperature control ON/OFF signal generation circuit for setting ON/OFF of the temperature control.

14. A temperature control circuit as claimed in claim 11, wherein the temperature control signal generation circuit includes:

an EXOR circuit which is supplied with the output signal of the first temperature comparison circuit and the output signal of the second temperature comparison circuit;

an AND circuit which is supplied with the output of the EXOR circuit and the inverted output of a second monostable multivibrator;

a first monostable multivibrator which is supplied with the output of the AND circuit to its clock terminal;

the second monostable multivibrator which is supplied with the inverted output of the first monostable multivibrator to its clock terminal; and a NOR circuit which is supplied with the output of the second monostable multivibrator and the output signal of the second temperature comparison circuit.

15. A temperature control circuit as claimed in claim 14, wherein the temperature control signal generation circuit further includes a second AND circuit which is supplied with the output of the NOR circuit and a temperature control ON/OFF signal which is supplied from a temperature control ON/OFF signal generation circuit for setting ON/OFF of the temperature control.

16. A temperature control method comprising the steps of:

a temperature detection step in which a temperature detection circuit detects the temperature of an object and outputs a temperature detection voltage that corresponds to the detected temperature of the object;

a first reference voltage generation step in which a first reference voltage generation circuit generates a first reference voltage that corresponds to the upper limit of a predetermined suitable temperature range for the object;

a second reference voltage generation step in which a second reference voltage generation circuit generates a second reference voltage that corresponds to the lower limit of the suitable temperature range for the object;

a first temperature comparison step in which a first temperature comparison circuit compares the temperature detection voltage with the first reference voltage which has been generated in the first reference voltage generation step;

a second temperature comparison step in which a second temperature comparison circuit compares the temperature detection voltage with the second reference voltage which has been generated in the second reference voltage generation step;

a temperature control signal generation step in which a temperature control signal generation circuit generates a temperature control signal for controlling ON/OFF of a power supply of a cooler, based on output signals of the first and second temperature comparison circuits; and a temperature control step in which a temperature control circuit sets ON/OFF the power supply of the cooler according to the temperature control signal.

17. A temperature control method as claimed in claim 16, wherein in the temperature control signal generation step:

a pulse oscillation signal is generated by a pulse oscillation signal generation circuit of the temperature control signal generation circuit as the temperature control signal in order to alternately change ON/OFF of the power supply of the cooler, when the output signal of the first temperature comparison circuit indicates that the temperature of the object is lower than the upper limit of the suitable temperature range and the output signal of the second temperature comparison circuit indicates that the temperature of the object is higher than the lower limit of the suitable temperature range;

a temperature control signal for setting the power supply of the cooler ON is generated by the temperature control signal generation circuit when the output signal of the first temperature comparison circuit indicates that the temperature of the object is higher than the upper limit of the suitable temperature range; and a temperature control signal for setting the power supply of the cooler OFF is generated by the temperature control signal generation circuit when the output signal of the second temperature comparison circuit indicates that the temperature of the object is lower than the lower limit of the suitable temperature range.

18. A temperature control method as claimed in claim 17, wherein the duty factor of the pulse oscillation signal outputted by the pulse oscillation signal generation circuit can be varied.

19. A temperature control method as claimed in claim 17, wherein the temperature control signal is used for setting ON/OFF of power supply to a Peltier chip which is included in the cooler.

20. A temperature control method as claimed in claim 16, further comprising a temperature control ON/OFF signal generation step in which a temperature control ON/OFF signal generation circuit outputs a temperature control ON/OFF signal for starting and ending the temperature control of the object to the temperature control signal generation circuit.

* * * * *